United States Patent

Lewin et al.

[11] Patent Number: 5,834,923
[45] Date of Patent: Nov. 10, 1998

[54] BATTERY CHARGE CONTROL METHOD

[75] Inventors: Andrew Wayne Lewin, Manassas; John J. Tandler, Herndon, both of Va.

[73] Assignee: Orbital Sciences Corporation, Del.

[21] Appl. No.: 997,923

[22] Filed: Dec. 24, 1997

[51] Int. Cl.[6] .......................... H01M 10/44; H01M 10/46
[52] U.S. Cl. ..................... 320/147; 320/DIG. 17
[58] Field of Search ...................... 320/124, 125, 320/127, 128, 132, 134, 136, 147, 150, 152, 153, 142, 145, DIG. 17, DIG. 21

[56] References Cited

U.S. PATENT DOCUMENTS 3,614,583 10/1971 Burkett et al. ........................... 320/129
3,691,448 9/1972 Milward ................... 320/132

*Primary Examiner*—Edward Tso
*Attorney, Agent, or Firm*—Jenner & Block

[57] ABSTRACT

A battery charge control method which relies upon the relationship between the battery state of charge and the charge efficiency. The battery charging efficiency is estimated by computing the amount of charge received by the battery as a function of input charge. Thermodynamic calculations are used to obtain an estimate of battery charge levels over a wide range of temperatures, and two stage filtering is used to obtain a useful slope from noisy charge level signals to determine charging efficiency and ultimately control the charge rate. The method is especially useful for recharging nickel-hydrogen batteries used aboard spacecraft. The battery charge in such a battery is estimated by computing the number of moles of hydrogen gas in a cell. The input charge is the integral of the charge current. Thus, the charge efficiency is proportional to the rate of change of the number of moles of gas with respect to the input charge. The method allows the charging to be controlled so as to charge the battery fully without overcharging, independent of the battery capacity, thus insuring full recharge, prolonging battery life and increasing efficiency.

18 Claims, 3 Drawing Sheets

BATTERY CHARGE CONTROL METHOD

BACKGROUND OF THE INVENTION

1. Field of the Invention

The invention relates generally to an improved method for charging rechargeable batteries, and specifically to a charging method for rechargeable nickel-hydrogen ($NiH_2$) batteries used on board spacecraft.

2. Description of the Prior Art

Conventional approaches for charging nickel-hydrogen batteries suffer from two key limitations. They either consistently overcharge the battery or they require knowledge of the battery capacity. Regular overcharging is undesirable because it decreases battery life. In certain applications, such as satellites and other spacecraft, the lost battery life can occur at the time of greatest usage demand. Obtaining accurate knowledge of battery capacity requires both an up-front effort to develop the necessary engineering tools and later the recurring effort and cost of determining capacity over the design life of the application (e.g., five to fifteen years in the case of satellites).

One of the two standard commercial charging practices uses tables of voltage and temperature to determine the full charge state of the battery. The second common method keeps track of the charge sent into the battery and the charge out of the battery. The input charge is controlled to be a constant ratio of the output charge. The drawback of this method is the accumulated error in the process. The NASA Handbook for Nickel-Hydrogen Batteries refers to a "dP/dt" method employed by Sandia National Laboratory, which uses the rate of change of battery pressure with time as an indication of the charge state. This approach neglects the impact of temperature variations in the battery and changes in the charge current.

Many commercial satellite applications (e.g., low earth orbit satellites) require both rapid charge rates and long battery cycle life. After charging, batteries are often trickle-charged at very low rates until discharging begins.

In satellite applications, there is a need for a battery charging scheme that is maintenance free, i.e., which does not require daily input from the ground or even periodic retuning. Further, it is desirable that the charge control system be capable of quickly and automatically recovering from a power system reset.

SUMMARY OF THE INVENTION

The invention overcomes the problems of the prior art and ensures that the battery is fully recharged after each discharge cycle; eliminates the need for periodic tuning or adjustment by autonomously adapting to changes in battery capacity and instrumentation drift; and prevents overcharging, thus prolonging battery life and increasing watt-hour efficiency. To overcome the limitations of the prior art, the battery charge control approach must depend upon measurable properties that do not change over the life of the application, e.g., the spacecraft. The control method according to the invention relies upon the relationship between the battery state of charge and the charge efficiency. It estimates the battery charging efficiency by computing the amount of charge received by the battery as a function of the input charge. Thermodynamic calculations are used to obtain an estimate of battery charge levels over a wide range of temperatures, and two-stage filtering is used to obtain a useful slope from noisy charge level signals to determine charging efficiency and ultimately control the charge rate.

When a battery is partially depleted, the majority of an input charge is stored in the battery, that is, the charge efficiency is high. In $NiH_2$ batteries, the storage of charge is observed as an increase in the amount of hydrogen gas present in the battery cell. As the battery is charged, a greater percentage of the input charge is converted to heat, while less is stored in the battery; that is, the charge efficiency drops as the battery charge approaches its capacity. Thus, the battery fullness can be determined by estimating the amount of charge accepted by the battery as a function of the input charge. The battery charge is estimated by computing the number of moles of hydrogen gas in the cell. The input charge is the integral of the charge current. Thus, the charge efficiency is proportional to the rate of change of the number of moles of $H_2$ gas with respect to the input charge. Expressed as a derivative, this value is dM/dC, where M=the number of moles of hydrogen gas and C=the input charge. This maintenance-free approach enables the charging routine to perfectly fill the battery—without overcharging—independent of the battery capacity.

The value dM/dC is constant for almost all battery states of charge; it only begins to drop when the battery is nearly full, Since the dM/dC calculation relies upon relative rather than absolute charge, it is unaffected by changes in the battery capacity over the life of the battery (and the life of the application, e.g., the spacecraft). In addition, dM/dC can be quickly estimated, allowing rapid recovery from a power system reset. Further, the state of charge can be estimated to within a few percentage points using battery pressure and temperature.

Because the algorithm of the invention is based upon a derivative estimate, there is an inherent noise rejection problem. When noise is added to a signal, the instantaneous derivative (rate of change) varies even more wildly than the signal itself. Another aspect of the invention is to provide a battery charge control system which is adept enough to respond to small decreases in dM/dC yet stable enough to avoid the inherent signal-to-noise problem at low charge rates.

DETAILED DESCRIPTION OF THE PREFERRED EMBODIMENT

Figure 1:
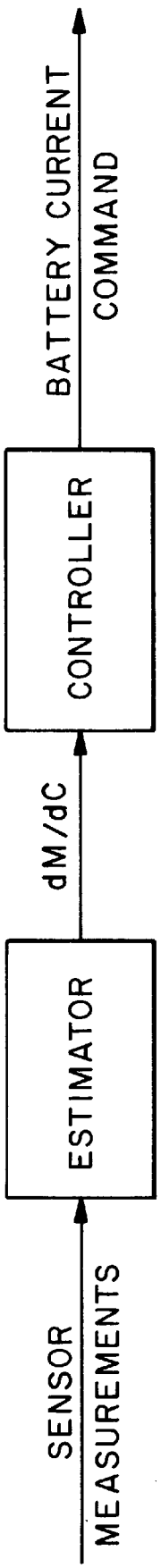
FIG. 1 is a block diagram of the battery charge control method of the invention.

A block diagram of the invention is shown in FIG. 1. Sensor measurements (i.e., battery pressure and current) are input to the estimator 1, which uses these measurements in an algorithm to estimate the charge efficiency, dM/dC. The calculated estimate of dM/dC is input to controller 2, which determines and sets the desired battery charge current based upon the estimated dM/dC.

Figure 2:
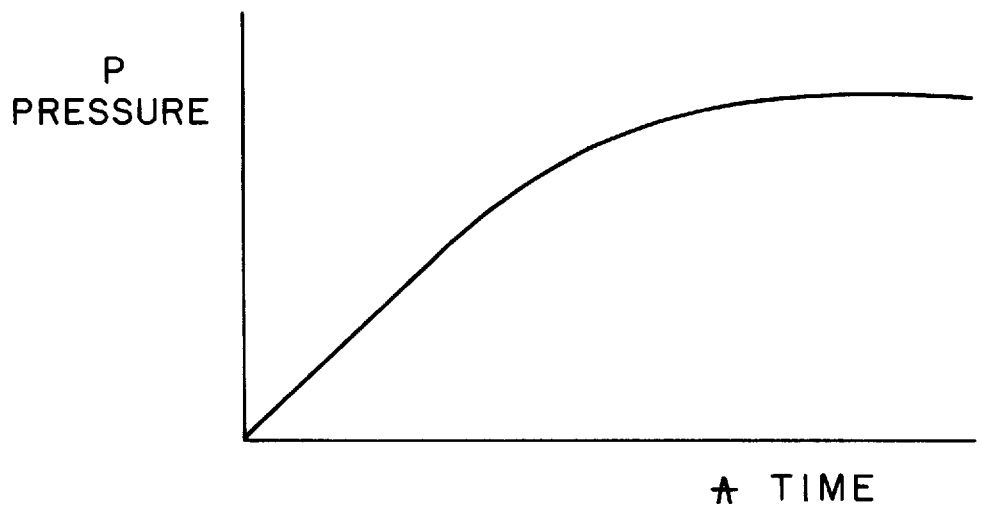
FIG. 2 is a graph of battery behavior during charging showing pressure as a function of time for a constant charge rate.
Figure 3:
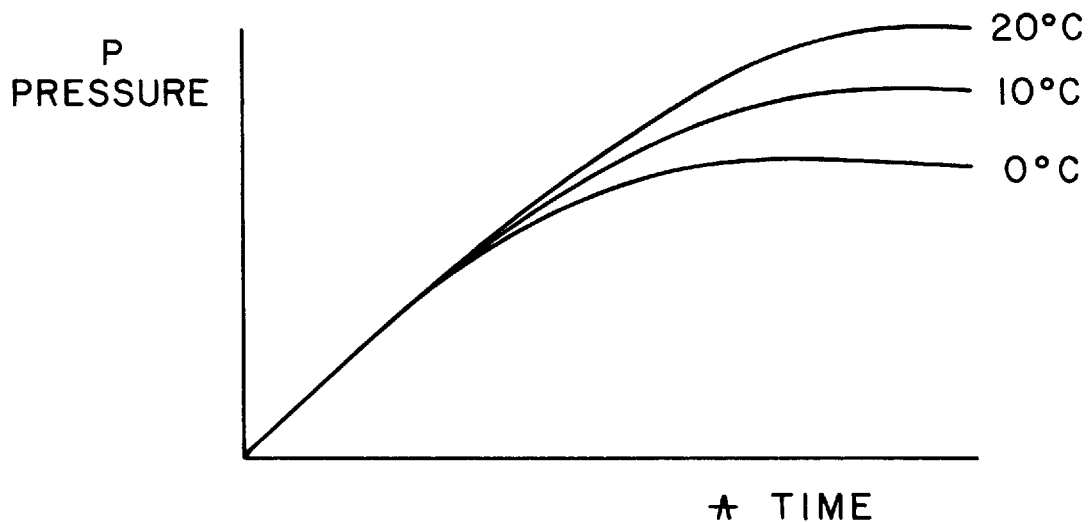
FIG. 3 is a graph of battery behavior during charging showing pressure as a function of time and temperature for a constant charge rate.

Hydrogen gas ($H_2$) is produced in the cells as a battery is charged. Thus, the battery charge is a direct function of the number of moles of hydrogen gas in the battery CVP (common pressure vessel). FIG. 2 shows how pressure increases over time during charging (assuming a constant charge rate). The pressure increase is linear until the cells approach full charge. As shown in FIG. 3, pressure is not independent of temperature, and battery capacity is a direct function of temperature. FIG. 3 illustrates the pressure at three different temperatures (again assuming a constant charge rate). Because capacity is temperature dependent (as governed by the laws of thermodynamics), it is preferable to estimate the battery charge efficiency by evaluating the rate of change of moles of hydrogen gas with respect to the charge sent to the battery, or dM/dC. This must be accomplished using only the measured data available, which are battery pressure, battery temperature, battery voltage and battery current. The invention actually requires only three of these measured values, namely pressure, temperature and current.

Figure 4:
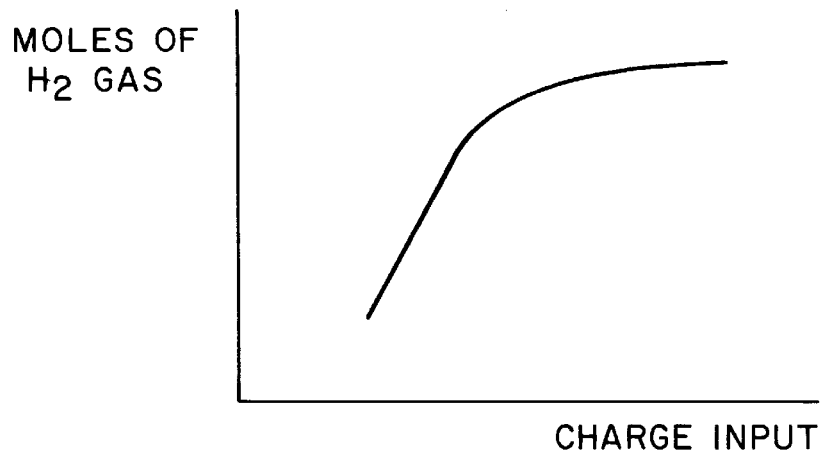
FIG. 4 is a graph of $NiH_2$ battery behavior during charging showing the moles of $H_2$ gas as a function of charge input.
Figure 5:
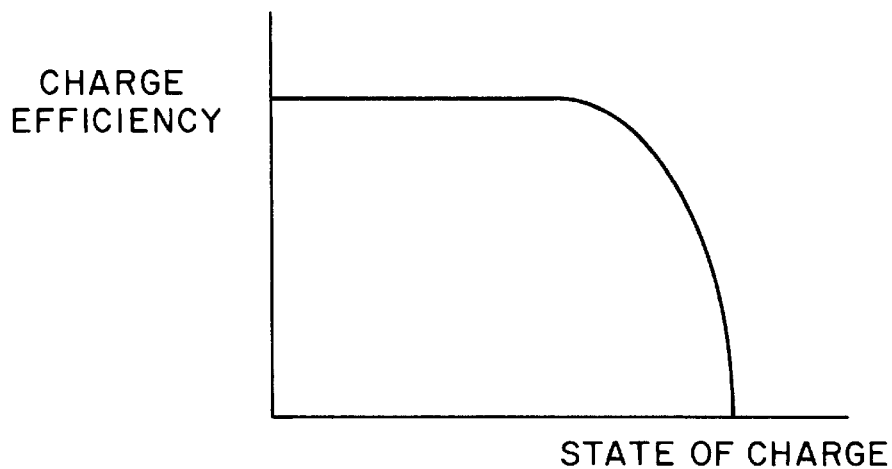
FIG. 5 is a graph of $NiH_2$ battery behavior during charging showing the charge efficiency versus the state of charge.

As a battery becomes full, it becomes more difficult to get charge into the battery. In other words, the charge efficiency decreases as the battery becomes full. This is illustrated in two different ways in FIGS. 4 and 5. FIG. 4 shows that as input charge increases, the moles of gas at first increase linearly. However, as the battery approaches full charge, the rate of increase of the moles of gas decreases and levels off. FIG. 5 shows that charge efficiency is essentially constant until the battery approaches full charge, at which point it decreases rapidly. To prevent overcharging, it is desirable to stop charging when the battery charge efficiency reaches a specified percentage of the maximum charge efficiency.

Thus, implementation of a dM/dC charge method requires an estimate of the change in the number of moles of hydrogen gas and the battery input charge. The number of moles of hydrogen gas is calculated using battery pressure and temperature measurements and the ideal gas law, PV=MRT:

M=PV/RT where

M=number of moles of gas
P=measured battery pressure
V=volume of battery cell
R=gas constant
T=measured battery temperature The rate of change is the derivative, dM=V/R d(P/T)

Since V and R are constants, they are immaterial to the derivative (the method requires the change, not the absolute number of moles). Thus, eliminating the constants and solving for M, the number of moles, and then taking the derivative gives a quantity proportional to the moles of gas:

M=P/T dM=d(P/T)

The input charge is the integral of the input current:

$C=\int I_{bat} dt$ $dC=I_{bat} dt$

These are combined to produce dM/dC in terms of measured quantities:

dM/dC=d(P/T) / $I_{bat}$dt

This is the mathematical basis of the dM/dC algorithm. Implementing the algorithm in a practical application presents several challenges. In particular, since the algorithm relies on a derivative calculation it will have difficulty with noise. It is necessary to quickly recognize changes in dM/dC while rejecting the high frequency noise component of dM. This is accomplished as follows.

The dM/dC estimator 1 is essentially a derived rate estimator. The derived rate estimator is a two-state filter that feeds back the present dM/dC estimate for use in the next estimate of M. The filter is described by the following equations:

$M = M_{old} + k_1(M_{meas} - M_{old}) + dM/dC_{old} I_{bat} dt$ $dM/dC = dM/dC_{old} + k_2 ((M_{meas} - M_{old})/I_{bat} dt)$ The derived rate filter alone provides a reasonably good estimate of dM/dC. However, to further reject high-frequency noise, a first-order low pass (lag) filter is applied to the output of the derived rate filter. The low pass filter is described as:

$dM/dC_f = (1-k_3) dM/dC_{fold} + k_3 (dM/dC_f)$

To examine the behavior of the resulting estimator, the three filter equations are combined and expressed in matrix form as follows:

$$\begin{bmatrix} \hat{M} \\ \frac{\hat{dM}}{dC} \\ \frac{\hat{dM}}{dC_f} \end{bmatrix} = \begin{bmatrix} 1-k_1 & I_{bat} & 0 \\ -\frac{k_2}{I_{bat}} & 1 & 0 \\ 0 & k_3 & 1-k_3 \end{bmatrix} \begin{bmatrix} \hat{M}_{old} \\ \frac{\hat{dM}}{dC_{old}} \\ \frac{\hat{dM}}{dC_{fold}} \end{bmatrix} + \begin{bmatrix} k_1 \\ k_2 \\ 0 \end{bmatrix} M_{meas}$$

The matrix describes a three pole filter—the derived rate filter has two complex poles and the low pass filter has one real pole. The eigenvalues of the 3×3 matrix yield the poles of the estimator. There is a single pole at the origin which represents the derivative. In terms of the gains k, the poles are located at:

$$1 - \frac{k_1}{2} \pm \sqrt{\left(\frac{k_1}{2} - 1\right)^2 - 1 + k_1 - k_2}$$

The placement of the real component of the poles determines the frequency response and time lag characteristics of the dM/dC charge algorithm. As the poles move closer to 1, the filter suppresses lower and lower frequencies. This produces an increasingly smooth and consistent estimate of dM/dC, but it comes at the cost of increased filter response time. The response time is important for batteries because a slow response time can lead to overcharging, which as previously noted significantly reduces battery life.

The algorithm, as implemented, modifies the pole locations to extract the best possible performance from all operating regimes. When dM/dC is high, the poles are moved away from the origin, allowing the dM/dC estimate to react quickly to a filling battery. When dM/dC is low, it takes longer to determine dM/dC due to the low signal, so the poles are moved towards the origin to slow down the algorithm. This increase in low pass filtering as the dM/dC estimate decreases prevents overcharging.

Figure 6:
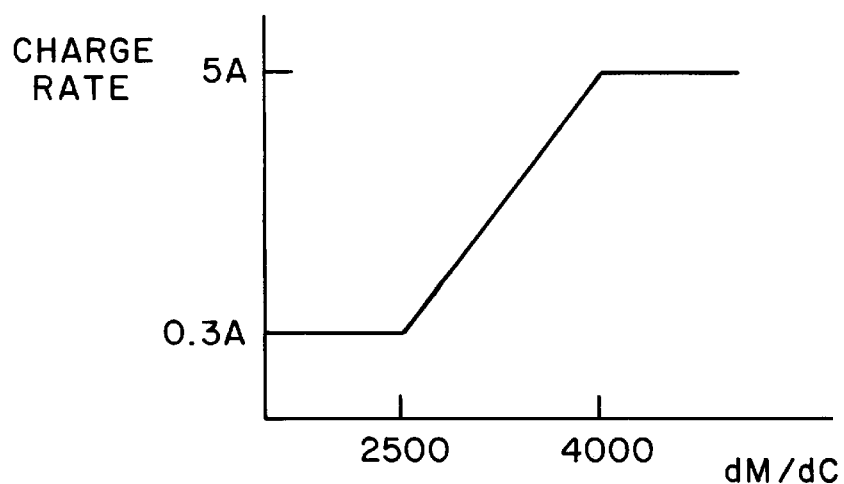
FIG. 6 is a graph of the charge control curve of the invention.

The controller 2 causes the battery charge current to operate in three regimes as shown in FIG. 6. For the majority of the charge cycle, the battery charges at its normal rate. As the battery approaches its full point, the charge current is decreased as a linear function of dM/dC. Finally, when dM/dC approaches a minimum value, the current is set to a trickle charge rate. This small charge current ensures that the battery remains full after battery charging is essentially complete.

The battery charge rate is linearly related to dM/dC. In a typical application, as shown in FIG. 6, the maximum charge rate is 5A, and the minimum trickle charge rate is 0.3 A. The maximum charge rate is used until the slope of the dM/dC curve reaches a defined percentage of a reference slope. The reference slope is dM/dC in the linear region. After the slope of dM/dC is less than that of the reference, the charge control curve shown in FIG. 6 is used.

The reference dM/dC value is determined experimentally with the batteries. This value will vary slightly from battery to battery. The full point definition is somewhat arbitrary. The algorithm as implemented halts charging when dM/dC drops to ⅔ of the reference slope.

The system handles initialization and recovery from a power system reset as follows. The algorithm resets itself after a specified period of continuous negative battery current, for example, 60 seconds. After reset, the algorithm estimates P/T using the available measurements and the low pass filter. This takes approximately 15 seconds. During the next 60 seconds, the estimator 1 is initialized to the dM/dC trickle charge transition point and begins normal operation. The controller 2 also operates normally, except that all charge rates below a minimum value, e.g., 1.5 A, are boosted to that value. This ensures that the signal being measured (dM/dC) is clearly above the noise.

Thus, the present invention, by applying thermodynamic principles and using available data, ensures that the battery is fully recharged after each discharge cycle; eliminates the need for periodic tuning or adjustment by autonomously adapting to changes in battery capacity and instrumentation drift; and prevents overcharging, thus prolonging battery life and increasing watt-hour efficiency.

While the above detailed description has shown and explained the fundamental novel features of the invention as applied to a preferred embodiment, it will be understood that various omissions, substitutions and changes in the form and details of the system and method may be made by those skilled in the art, without departing from the spirit of the invention.

We claim:

1. A method for controlling the charging a rechargeable battery comprising the steps of:
   estimating the charge efficiency of the battery as the rate of change of the number of moles of gas in the battery with respect to the input charge to the battery; and
   controlling the charge rate based on the charge efficiency estimate.

2. The method of claim 1 wherein the step of estimating the charge efficiency comprises the steps of:
   measuring the battery pressure and temperature;
   measuring the battery charge current;
   calculating the rate of change of the number of moles of gas in the battery by taking the derivative of the ratio of the battery pressure to the battery temperature;
   calculating the input charge as the integral of the battery charge current; and
   calculating the estimated charge efficiency as the ratio of the rate of change of the number of moles of gas to the derivative of the input charge.

3. The method of claim 2 wherein the estimation of the charge efficiency is performed by a derived rate estimator.

4. The method of claim 3 wherein the derived rate estimator is a two-stage filter.

5. The method of claim 3 further comprising the step of applying a first-order low pass filter to the output of the derived rate estimator.

6. The method of claim 5 further comprising the step of increasing the low pass filtering as the efficiency estimate decreases.

7. The method of claim 1 further comprising the step of decreasing the charge rate as a linear function of the charge efficiency as the battery approaches its full charge point.

8. The method of claim 1 further comprising the step of controlling the charge current to a trickle charge rate when the charge efficiency approaches a minimum value.

9. The method of claim 7 wherein the charge rate is decreased when the slope of the estimated charge efficiency curve reaches a predetermined percentage of the slope of a reference curve.

10. The method of claim 9 wherein the reference curve is determined experimentally with the battery.

11. The method of claim 9 wherein the predetermined percentage is 66⅔%.

12. The method of claim 1 further comprising the step of resetting the charge efficiency calculation process after a predetermined period of negative battery current.

13. The method of claim 12 wherein the period is 60 seconds.

14. A charge control system for a rechargeable battery, comprising:
   estimating means for estimating the charge efficiency of the battery as the rate of change of the number of moles of gas in the battery with respect to the input charge to the battery; and
   control means for controlling the charge rate based on the charge efficiency estimate.

15. The charge control system of claim 14, further comprising:
   battery pressure measuring means;
   battery temperature measuring means;
   battery charge current measuring means;
   means for calculating the rate of change of the number of moles of gas in the battery by taking the derivative of the ratio of the battery pressure to the battery temperature;
   means for calculating the input charge as the integral of the battery charge current; and
   means for calculating the estimated charge efficiency as the ratio of the rate of change of the number of moles of gas to the derivative of the input charge.

16. The charge control system of claim 15 wherein the estimating means comprises a derived rate estimator.

17. The charge control system of claim 16 wherein the derived rate estimator is a two-stage filter.

18. The charge control system of claim 16 further comprising a first-order low pass filter connected to the output of the derived rate estimator.

* * * * *

UNITED STATES PATENT AND TRADEMARK OFFICE
CERTIFICATE OF CORRECTION

PATENT NO. : 5,834,923
DATED : November 10, 1998
INVENTOR(S) : Andrew Wayne Lewin and John J. Tandler It is certified that error appears in the above-indentified patent and that said Letters Patent is hereby corrected as shown below:

Column 4, line 40, insert -- $1$-$K_3$ --

Signed and Sealed this

Twenty-third Day of March, 1999

Attest:

Q. TODD DICKINSON

*Attesting Officer*     *Acting Commissioner of Patents and Trademarks*